United States Patent [19]

Baierl

[11] 4,002,525
[45] Jan. 11, 1977

[54] CHEMICAL RECOVERY FROM WASTE LIQUORS UTILIZING INDIRECT HEAT EXCHANGERS IN MULTI-STAGE EVAPORATION PLUS CONTACT STEAM STRIPPING

[75] Inventor: Kenneth W. Baierl, Appleton, Wis.

[73] Assignee: Flambeau Paper Company, Park Falls, Wis.

[22] Filed: Mar. 13, 1975

[21] Appl. No.: 558,003

[52] U.S. Cl. ..................... 159/47 WL; 159/17 VS; 159/49
[51] Int. Cl.² ..................... B01D 1/26; B01D 1/00; B01D 1/22
[58] Field of Search .......... 159/4 A, 17 R, 47 WL, 159/48 L, 17 VS, 49; 162/15, 16, 30

[56] References Cited
UNITED STATES PATENTS

| | | | |
|---|---|---|---|
| 1,689,534 | 10/1928 | Richter | 159/47 WL |
| 3,026,240 | 3/1962 | Matty | 159/4 A |
| 3,183,145 | 5/1965 | Collins, Jr. | 162/15 |
| 3,414,038 | 12/1968 | Laakso | 159/47 WL |
| 3,764,461 | 10/1973 | Baierl | 162/16 |
| 3,764,462 | 10/1973 | Baierl | 162/16 |
| 3,816,239 | 6/1974 | Marks | 162/15 |

FOREIGN PATENTS OR APPLICATIONS 180,972   10/1962   Sweden ............................ 159/4 A

*Primary Examiner*—Jack Sofer
*Attorney, Agent, or Firm*—Schmidt, Johnson, Hovey & Williams

[57] ABSTRACT

A method of treating waste liquors such as those derived from the sulfite or Kraft pulp making process is disclosed which provides recovered by-products of high purity while moreover decreasing the total amount of process steam required. The method comprises steam stripping the evaporator condensate feed to remove volatile chemical by-products therefrom, and thereafter directing the stripping steam for reuse in concentrating additional volumes of feed in the evaporator. In this manner, the only steam lost during the stripping operation is that used for increasing the sensible heat of the evaporator condensate feed within the steam stripping column. The condensed steam and volatile by-products resulting from evaporator heating operation are then preferably directed to a fractionation column or columns in order to separate and recover the valuable by-products for reuse or sale. In situations where the condensate feed contains volatile, noncondensible gases which are valuable for reuse, the evaporator condensate feed may be preheated and contacted with evaporator vent gases. The latter are partially condensed to allow the noncondensible gases to be recovered and reused, and the condensed liquor is cooled and passed through an activated carbon column prior to steam stripping in order to facilitate the recovery of chemical by-products and enhance the purity thereof.

23 Claims, 3 Drawing Figures

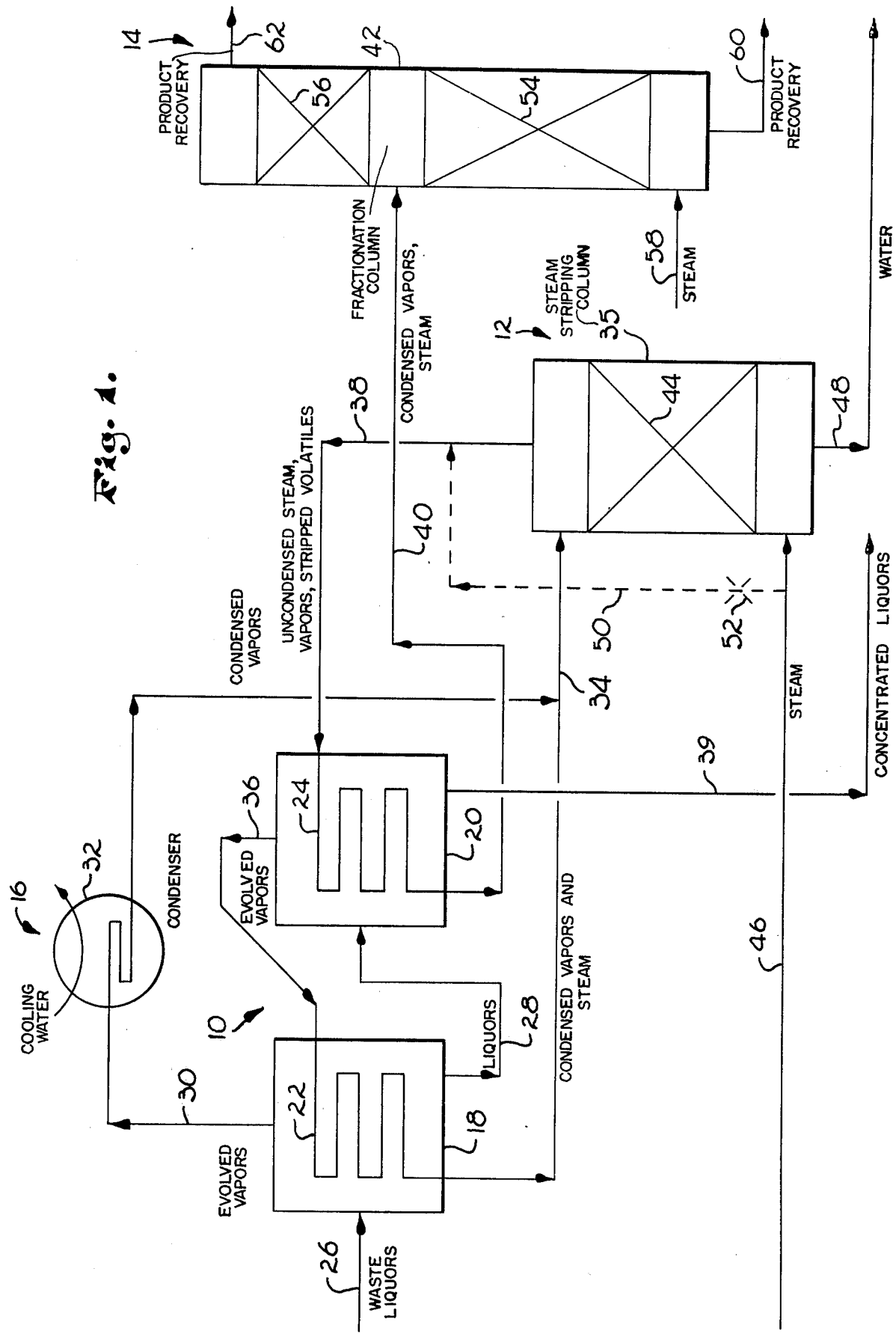

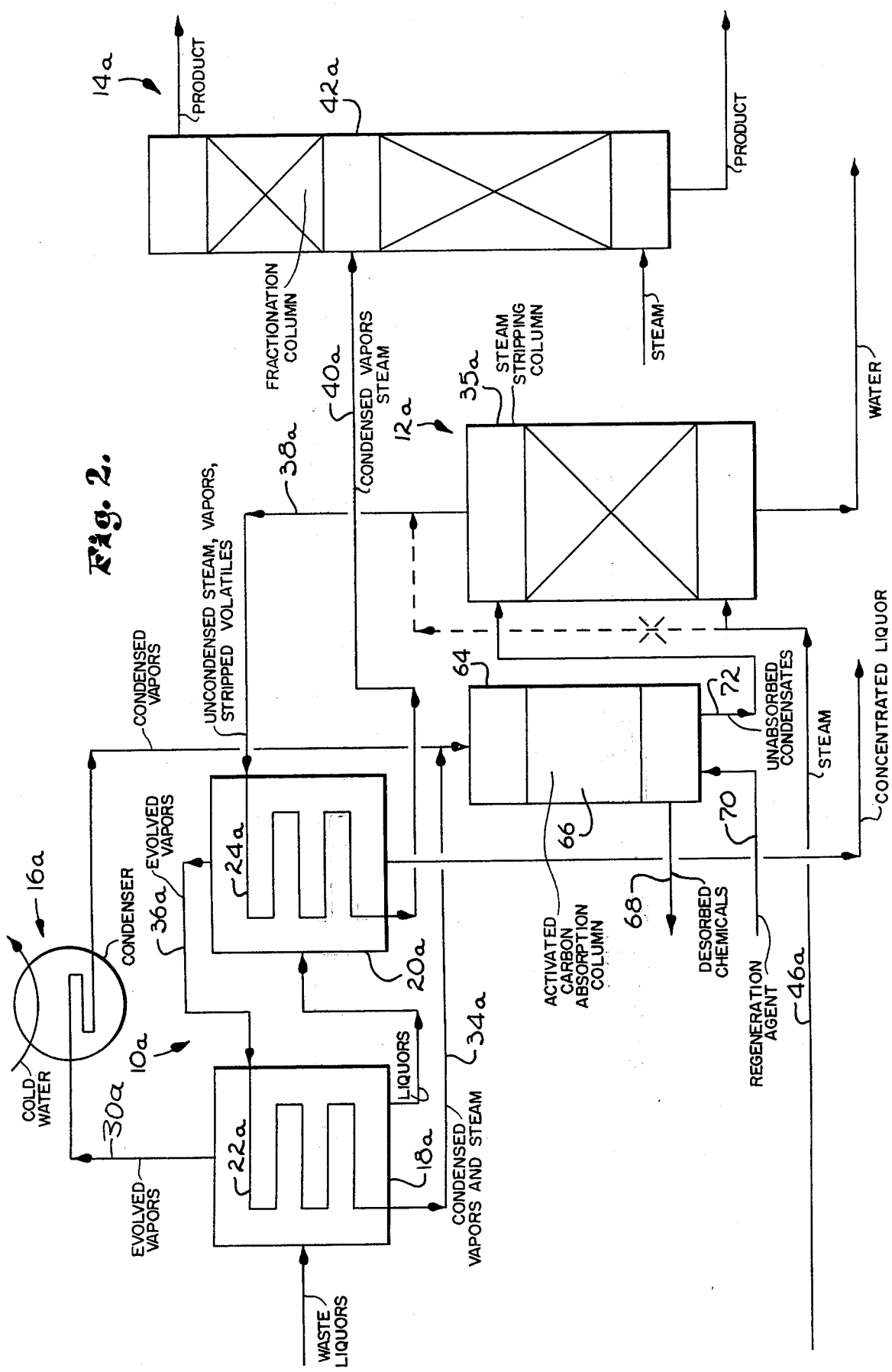

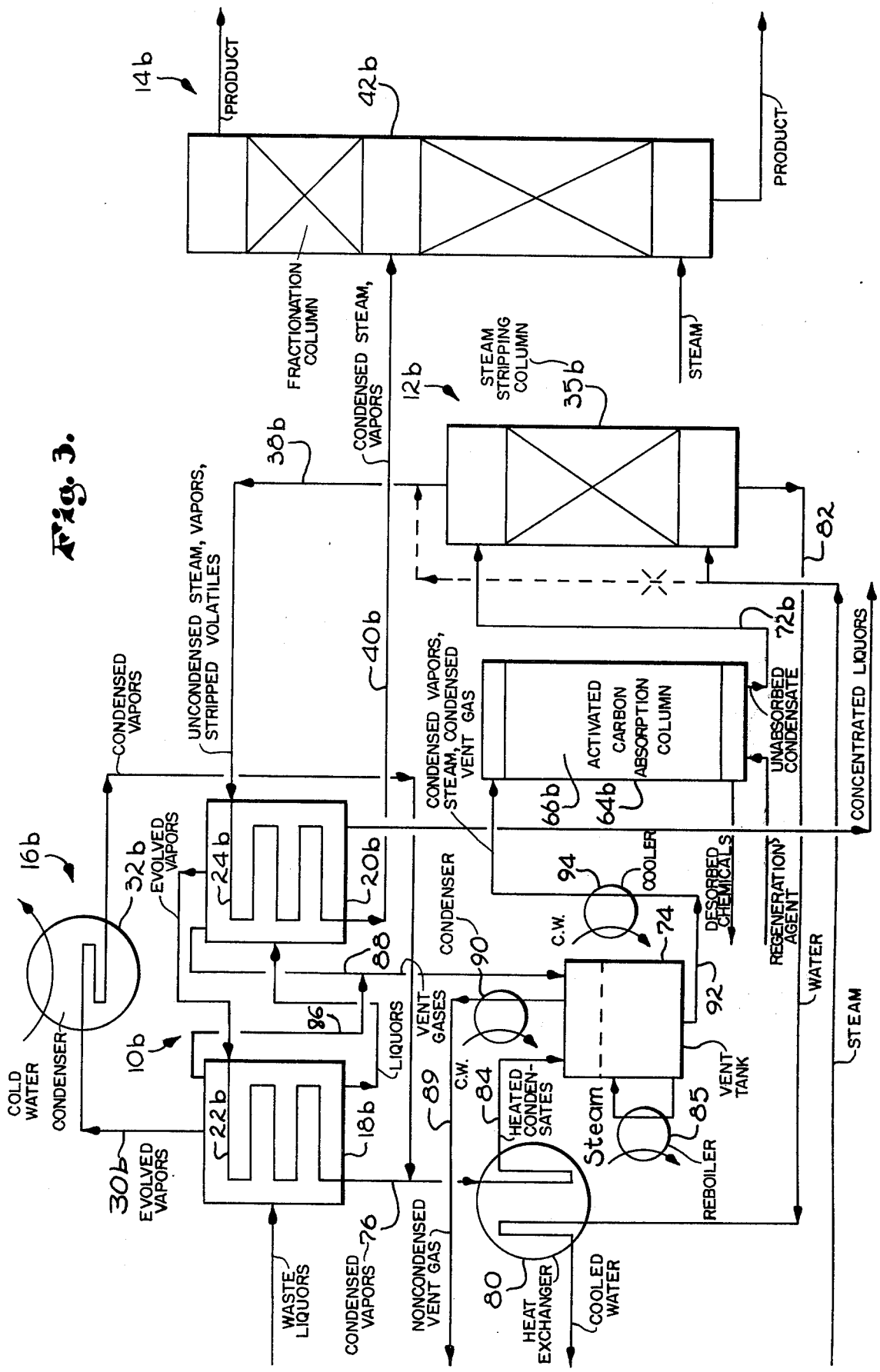

CHEMICAL RECOVERY FROM WASTE LIQUORS UTILIZING INDIRECT HEAT EXCHANGERS IN MULTI-STAGE EVAPORATION PLUS CONTACT STEAM STRIPPING

This invention is concerned with the efficient and economical treatment of many types of waste liquors containing valuable chemical constituents, and especially those derived from pulp making processes, for example the well known sulfite and Kraft processes. More particularly, it is concerned with such a treating method which is characterized by extremely low steam consumption and essentially complete recovery of the chemical by-products at high purity. It is to be understood however, that the invention should not be restricted to pulp making processes, since it has wide application in other pulping and chemical processes where volatile chemicals appear in evaporator condensates. These would include a variety of textile, chemical, and petro-chemical processes in common use today.

In all types of industry today, there is an ever increasing concern about rising fuel prices and the attendant costs of process steam or other forms of heat. In many cases, the cost of steam has tripled or even quadrupled in price over a very short span of time, and accordingly operators of chemical processing plants or the like have been searching for ways to conserve this valuable resource.

At the same time, increasingly stringent governmental pollution regulations have caused concern. In particular, newly promulgated environmental protection standards have drastically reduced the allowable amount of pollutants which may be discharged into rivers or streams or allowed to escape to the atmosphere. As a consequence of these factors, operational costs in the chemical processing and related industries have risen precipitously in recent years.

The problems alluded to above are especially significant in the pulp and paper making industry. First of all, pulp and paper making require substantial quantities of steam or other heat, and rising fuel costs have therefore been significant. Moreover, the long standing practice of some mills of simply discharging effluent wastes into nearby streams or rivers has required modification, thus entailing further expense. For example, in the sulfite pulp making process, waste digester liquors and condensate contain appreciable quantities of methanol, furfural, acetic acid and sulfur dioxide. On the other hand, a typical Kraft effluent may contain methanol, ethanol, acetone, dimethyl sulfite, dimethyl disulfite and alpha pinene. In general, all of these chemicals must be adequately removed from pulp mill effluents in order to prevent unlawful pollution.

It will also be appreciated that the by-products from the sulfite and Kraft processes can represent a significant economic advantage if they can be recovered for reuse and resale at a sufficiently low cost. In this connection, prior attempts at by-product recovery have met with little success, principally by virtue of the high cost of the suggested methods and the fact that the by-products were generally not recovered at sufficient purity to permit their sale or reuse without additional purification treatments.

It is therefore the most important object of the present invention to provide a method of treating all types of waste liquors, evaporation, blow and relief gas condensates, and especially those derived from pulp making operations such as the sulfite and Kraft processes, which minimizes overall steam consumption and moreover yields essentially complete recovery of valuable chemical by-products at a purity level permitting their immediate sale or reuse without substantial further treatment.

Another object of the invention is to provide a method for the treatment of such pulp making waste condensates which includes directing evaporator condensate from an evaporator to a steam stripping column wherein steam is contacted with the feed to entrain and remove volatile chemical constituents therefrom, whereupon the steam leaving the stripper is directed back to the evaporators for evaporation of additional volumes of waste liquors. In this manner, the total amount of steam used in the process is drastically reduced since only that amount of steam needed to raise the sensible heat of the condensate feed is lost during stripping. In addition, because of the reuse of the steam, greater quantities thereof can be utilized in stripping, thereby ensuring substantially total recovery of chemical by-products contained in the condensates.

A still further object of the invention is to provide a method as described above wherein the evaporator condensate feed is first passed through an adsorption column, such as an activated carbon column, prior to steam stripping thereof in order to adsorb a large portion of the chemical by-products and ensure that essentially all of the valuable by-products are removed.

Another object of the invention is to provide a method wherein the evaporator condensates are first preheated using the bottoms off the steam stripping column, the preheated condensates then being contacted with evaporator vent gases, heated and thereafter cooled and passed through an activated carbon column prior to steam stripping. In this fashion the chemical constituents are recovered in greater amounts, and valuable materials such as sulfur dioxide or hydrogen sulfide can be collected at high purity for further use.

In the drawings:

FIG. 1 is a schematic representation of a waste liquor treatment facility in accordance with the present invention and illustrating the dual use of processing steam for steam stripping and heating of the evaporator effects;

FIG. 2 is a schematic representation similar to that shown in FIG. 1, but depicting an adsorption column for the treatment of the evaporator condensate feed prior to steam stripping thereof; and FIG. 3 is a schematic representation similar to those shown in FIGS. 1-2, but illustrating the use of a heat exchanger for preheating the evaporator condensates prior to adsorption treatment thereof.

As briefly discussed above, the present invention in its broadest form is concerned with a method of treating condensates from waste liquors wherein the waste liquors are first concentrated in an evaporation zone and thereafter the condensate is directed to a stripping zone for contact with stripping steam for entrainment and removal of volatile chemical constituents therefrom. The stripping steam is thereafter directed to the evaporation zone in order to concentrate additional volumes of the waste liquors therein. In this manner, steam consumption is greatly reduced by virtue of the fact that the stripping process utilizes only that amount of steam required to increase the sensible heat of the evaporator condensate feed. In one commercial sulfite plant, the daily savings in steam amount to about 145,000 lbs., as compared with conventional past practices. In addition, minimization of steam loss permits substantially greater quantities of stripping steam to be employed in the stripping operation itself, thus ensuring essentially complete removal of the valuable chemical constituents from the waste liquors.

Referring now to schematic FIG. 1, there is shown an apparatus and method in accordance with the present invention. In particular, this Figure depicts apparatus for use in treating waste liquors derived from the well known sulfite or Kraft pulp making processes, and for illustrative purposes the following discussion will center around treatment of waste liquors from such pulp making methods. Broadly, an evaporation zone 10 is provided for concentrating the waste liquors from the pulp making process (as used in the ensuing discussion, the term "waste liquors" refers to liquids and condensates derived from pulp making, for example evaporator, digester relief and blow gas condensates, and the spent liquid pulping liquor itself). In addition, a steam stripping zone 12 is included for countercurrently contacting the condensates leaving evaporation zone 10 with stripping steam, the latter thereafter passing back to zone 10 along with any entrained chemical constituents for heating and concentrating additional volumes of waste liquors. A fractionation zone 14 is provided for separating the valuable chemical constituents from the condensed steam resulting from concentration of the additional waste liquor volumes within evaporation zone 10. Finally a vent condenser zone 16 is provided for the recovery of valuable chemical materials derived from vapors venting from evaporation zone 10.

In particular, evaporation zone 10 conventionally comprises one or more so-called evaporator effects. For purposes of illustration, only two interconnected effects 18 and 20 are shown, but it is to be understood that it is common practice to provide more than two of these units. Each effect 18 and 20 includes a evaporation chamber with adjacent respective heat exchange sections 22 and 24 adapted to receive steam for heating the contents of evaporation chambers.

Waste liquors are fed to the evaporation chamber of effect 18 via feed line 26, and a line 28 is also provided between the chambers of effects 18 and 20 for the purpose of transferring a portion of the liquor feed to the latter. A vapor line 30 is in communication with the evaporation chamber of effect 18 for the purpose of conveying the volatiles therefrom. Line 30 passes through a conventional surface condenser 32 and is interconnected with condensate feed line 34. The latter is connected between the outlet of heat exchange section 22 of effect 18 and steam stripping column 35 of zone 12 which is important for purposes to be made clear hereinafter.

Vapor line 36 is interconnected between the evaporation chamber of effect 20 and the inlet end of heat exchange section 22 of effect 18 for the purpose of transferring volatiles from effect 20 to the heat exchanger of effect 18. Line 38 is operatively connected between the top of steam stripping column 35 and the inlet of exchanger 24 of effect 20, and a line 40 is provided between the outlet of exchanger 24 and the fractionation column 42 of zone 14. Finally, line 39 is provided for removing concentrated spent liquor from effect 20.

Steam stripping zone 12 includes a conventional column 35 having a central packing 44 composed of, for example, rings, saddles on other means for increasing the contacting surface area between countercurrently flowing steam and condensates. A line 46 is connected to the bottom of column 35 for directing steam thereto, and an underflow line 48 is also provided for transferring water from the bottom of the column. In addition a secondary steam line 50 is interconnected between lines 46 and 38 for the purpose of delivering steam to the latter as needed. A valve 52 is interposed within line 50 for permitting the selective opening and closing of the latter.

Fractionation zone 14 includes a conventional fractionation column 42 having upper and lower packing sections 56 and 54 respectively composed of bubble caps, sieve trays, rings, saddles or other types of packing. Moreover, additional fractionation columns can be used if necessary. A lower steam line 58 is provided for directing steam to the bottom of column 42, along with lower and upper exit lines 60 and 62 for selectively drawing off separated chemical constituents from the column.

In operation, spent liquors from a Kraft or sulfite process for example are fed through lines 26 and 28 into the evaporation chambers of the respective effects 18 and 20. The liquors are concentrated within the effects with the volatiles from effect 18 passing through line 30 for condensation in condenser 32. The condensed products are then transferred to line 34 for purposes to be explained.

In addition, the volatiles derived from the concentration of spent liquor within the chamber of effect 20 exit through line 36 to the inlet of exchanger 22 of effect 18. These heated materials thus serve to heat the evaporation chamber of effect 18 so that additional volumes of spent liquor can be concentrated therein. As a consequence of the heat exchange between the volatiles within exchanger 22 and the spent liquor within effect 18, the volatiles become condensed and in this condition are transferred via line 34 (along with added condensates from line 30) to the top of steam stripping column 35.

The condensates entering column 35 come into counter-current contact with stripping steam delivered to the bottom of the latter through line 46. Preferably, the temperature and pressure of the condensate feed near the top of column 35 are correlated such that the feed is near its bubble point.

The countercurrent steam stripping has the effect of stripping substantially all of the volatile chemical constituents from the condensate feed entering column 35, thus leaving an underflow of substantially pure water which exits the column through line 48. such water is available for reuse in the plant or may simply be returned to a nearby stream or river.

In the latter connection, it is possible to remove substantially all of the chemical constituents from the evaporator condensates since greater quantities of steam can be used for this purpose than has conventionally been employed. That is, it is common in pulp making processes to steam strip with an amount of steam equal to approximately 10% by weight of the incoming feed, with the column overhead being lost; in the present invention however, from 15 to 35% by weight steam stripping (most preferably about 30% by weight) is not only practical but highly advantageous. Hence, while in the prior steam stripping method only about 70% of the chemical constituents were commonly removed, the present method permits 99% removal of such constituents, and with little loss of steam. This steam saving results principally from the fact that the amount of steam utilized in the stripping column equals only that amount needed to increase the sensible heat of the condensates; thus, a very large proportion of the steam (with entrained chemicals therein) can be directed back to the evaporator effects for the purpose of concentrating additional volumes of liquor feed.

The overhead from column 35 comprises unused quantities of steam along with entrained chemicals derived from the condensate feed. This mixture is fed through line 38 to the inlet of exchanger 24 of effect 20 for the purpose of heating additional volumes of spent liquor within effect 20, with consequent condensation of the steam and volatiles.

Condensed steam and volatiles from exchanger 24 is then directed through line 40 to the central portion of fractionation column 42. Again, additional fractionation columns can be used if necessary. Steam delivered to the latter through line 58 heats and refluxes the condensed materials from line 40 to thereby enhance the ultimate separation of the chemical fractions therein, all as is well known to those skilled in the art. These fractions can then be selectively drawn off through exit lines 60 and 62 for reuse or sale. In this connection, the processes hereof have been found to yield end products of salable purity. Further purification steps can be added if required and are economically feasible, such as, for example, use of additional purification columns.

The embodiment depicted in FIG. 2 is similar in many respects to that of FIG. 1. For example, the FIG. 2 embodiment includes an evaporation zone 10a, steam stripping zone 12a, fractionation zone 14a and a condensation zone 16a which are identical in every respect with the FIG. 1 construction. However, in this case an adsorption column 64 is provided between the evaporator effects 18a and 20a and steam stripping column 35a. Column 64 is designed to adsorb at least a portion of the recoverable chemical constituents from the evaporator condensate feed prior to steam stripping thereof in order to increase the overall efficiency of the present recovery system and method.

In particular, the condensates from lines 30a and 34a are directed to the top of column 64 and allowed to descend therethrough. Of course, in other specific applications of the apparatus depicted in FIG. 2, the feed could be delivered to the bottom of the carbon adsorption column for upward travel therethrough. In this connection it has been found that a packing 66 of activated carbon is especially effective for adsorbing certain of the chemical fractions from the feed of Kraft or sulfite condensates, and accordingly activated carbon is preferred.

In order to permit removal of the adsorbed chemical values, an exit line 68 in conjunction with a regeneration line 70 are provided. The latter permits introduction of ethanol, steam or any other regeneration agents, while line 68 permits recovery and subsequent fractionation of the adsorbed chemical constituents. In addition, the unadsorbed effluent off column 64 passes through line 72 to the top of steam stripping column 35a for further treatment therein.

In this connection, it will be seen that steam from line 46a is directed to the bottom of steam stripping column 35a for steam stripping of the effluent from adsorbing column 64. Counter-current steam stripping is thus accomplished in a manner identical with that described in connection with FIG. 1, and line 38a is provided for the purpose of returning the unused steam and entrained chemical constituents to the heat exchange section 24a of effect 20a. This has the effect of heating and concentrating the spent liquors within effect 20a which in turn creates hot volatiles which are directed through line 36a for concentrating the spent liquor within effect 18a. At this point the condensates from the exchangers 22a and 24a are returned to adsorption column 64 and fractionation column 42a respectively in order to complete the process cycle as described with reference to FIG. 1.

It will thus be seen that the embodiment of FIG. 2 differs from that in FIG. 1 only by provision of the activated carbon column 64. However, this particular embodiment is preferred since in practice it has permitted the recovery of greater quantities of chemicals from the evaporator feed. In addition, provision of column 64 produces cleaner overhead vapors leaving steam stripping column 35a through line 38a to minimize evaporator heating surface scaling. This results in better heat transfer in the effects 18a and 20a which in turn lessens the amount of steam required and/or the surface area in the evaporator heat exchangers for spent liquor concentration therein.

The most preferred embodiment of the invention is illustrated in the schematic of FIG. 3. The apparatus is in most ways identical with that of FIGS. 1 and 2 and includes an evaporation zone 10b having for purposes of example a pair of effects 18b and 20b. In addition, a stripping zone 12b with column 35b is provided, along with a fractionation zone 14b comprising a fractionation column 42b and a condensation zone 16b having a surface condenser 32b. An activated carbon adsorption column 64b is also included for pretreatment of the feed condensates prior to steam stripping thereof in column 35b.

A heat exchanger 80 is also provided in this embodiment for the purpose of utilizing the heat from the underflow off steam stripping column 35b to preheat the evaporator condensates. In addition, a vent tank 74 is provided for contacting the evaporator vent gases and the preheated evaporator condensates prior to adsorption, steam stripping and fractionation of the latter as set forth above.

In particular, a line 76 is interconnected between the output of heat exchanger 22b of effect 18b and a surface heat exchanger 80. Vapor line 81 leading from the evaporation chamber of effect 18b passes through condenser 32b and ultimately interconnects with line 76 so that the condensed vapors leaving condenser 32b, along with the condensates from exchanger 22b, pass through heat exchanger 80. A line 82 is provided for collecting the underflow from steam stripping column 35b and delivering same to exchanger 80 so that such underflow can preheat the condensates within line 76.

The preheated condensates leaving exchanger 80 pass through line 84 which is connected to vent tank 74. In addition, evaporator vent gases collected from effects 18b and 20b are transferred via interconnected lines 86 and 88 to vent tank 74. Thus, the vent gases and preheated condensates are brought into direct contact within tank 74, in order to ensure the most complete recovery of valuable chemicals in the process. In this respect, the temperature of the vapor-condensate mixture within tank 74 is maintained at a level of above about 205° F. by means of a reboiler or exchanger 85 (if necessary) so that any gases such as $SO_2$ or $H_2S$ are volatilized.

The vapor overhead leaving tank 74 is conveyed through line 89 through partial condenser 90 in order to recover volatile chemicals and purify any sulfur dioxide or hydrogen sulfide gases derived from the sulfite or Kraft processes respectively.

Finally, the liquid underflow from tank 74 is transferred via line 92 through cooler 94 where it is cooled to a level of about 120° F. The cooled underflow is then allowed to descend through the activated carbon packing 66b within column 64b. The effluent off column 64b then travels through line 72b for steam stripping within column 35b, and the overhead of the latter is directed via line 38b to the input of exchanger 24b of effect 20b. The output of the latter is connected through line 40b to fractionation column 42b for reflux and recovery of the valuable chemical constituents in the manner outlined above.

In summary, the preferred embodiment of FIG. 3 differs from that of FIG. 2 principally by provision of heat exchanger 80 for preheating the evaporator condensates and vent tank 74. This embodiment is especially preferred since in practice it has permitted recovery of a greater percentage of the volatile chemicals within the spent digester liquors while at the same time minimizing heat requirements and permitting reuse of the recovered, highly concentrated sulfur dioxide or hydrogen sulfide within the mill.

The following illustrative Examples will demonstrate the usefulness of the present invention in the recovery of valuable chemical products at minimum expense in terms of heat loss.

EXAMPLE I

Sulfite process waste condensates from the condensed digester relief and blow gases, as well as the condensates derived from the evaporation of spent pulping liquor, are analyzed to contain the following:

TABLE 1

| Waste Liquor Constituents | % by weight | Feed Rate (lb/hr) |
| --- | --- | --- |
| methanol | 0.13 | 124 |
| furfural | 0.07 | 72 |
| acetic acid | 0.61 | 602 |
| sulfur dioxide | 0.01 | 10 |
| water | 99.18 | 97,892 |

This condensate feed is directed to the top of a steam stripping column from a multi-effect evaporator at a rate of about 98,700 lb/hr (the feed rates in the right hand column of Table 1 relate to those of the individual constituents). Steam is fed to the lower end of the tower at a rate of 25,000 lb/hr (or 25.4% by weight, based upon feed weight). This results in effective counter-current stripping of the feed such that the column bottoms consist of:

TABLE 2

| Column Bottoms | % by weight | Flow Rate (lb/hr) |
| --- | --- | --- |
| methanol | 0.001 | 1 |
| furfural | 0.001 | 1 |
| acetic acid | 0.548 | 542 |
| sulfur dioxide | — | — |
| water | 99,406 | |

These bottoms leave the column at a rate of 99,950 lb/hr.

The vapor overhead leaving the upper end of the stripping column (at a rate of 23,750 lb/hr) consists of:

TABLE 3

| Overhead | % by weight | Flow Rate (lb/hr) |
| --- | --- | --- |
| methanol | 0.52 | 123 |
| furfural | 0.30 | 71 |
| acetic acid | 0.25 | 60 |
| sulfur dioxide | 0.04 | 10 |
| water | 98.89 | 23,486 |

This data indicates that substantially all of the chemical constituents within the condensate feed are removed using only about 1250 lb/hr of steam. The remainder of the process steam is then available for reuse in heating the evaporator effects, as discussed hereinabove.

In a parallel test using the identical feed steam as set forth in Table 1, conventional steam stripping at 10% by weight of feed (i.e., 9,870 lb/hr steam) is attempted. This results in the following for the column bottoms and overhead:

TABLE 4

| Column Bottoms | % by weight | [1]Flow Rate (lb/hr) |
| --- | --- | --- |
| methanol | 0.037 | 37 |
| furfural | 0.022 | 22 |
| acetic acid | 0.542 | 542 |
| sulfur dioxide | 0.001 | 1 |
| water | 99.398 | 99,348 |

[1]total flow rate=99,950 lb/hr.

TABLE 5

| Overhead | % by weight | [1]Flow Rate (lb/hr) |
| --- | --- | --- |
| methanol | 1.01 | 87 |
| furfural | 0.58 | 50 |
| acetic acid | 0.70 | 60 |
| sulfur dioxide | 0.10 | 9 |
| water | 97.61 | 8414 |

[1]total flow rate=8,620 lb/hr.

It will thus be seen that the 10% by weight steam stripping is less effective than that in accordance with the invention. More important however, in the 10% steam method, the overhead steam has conventionally been vented to the atmosphere without any reuse whatsoever. This of course represents a significant heat loss and consequent expense to the pulp mill.

EXAMPLE II

In this example the conditions and sulfite evaporator condensate feed are identical with those of Example I, except that the feed is first treated in an activated carbon adsorption column prior to steam stripping. The feed is directed to the top of such a conventional column and during descending travel therethrough the chemical constituents are in part adsorbed. In particular, the adsorption column effluent consists of:

TABLE 6

| Carbon Column Effluent | % by weight | [1]Flow Rate (lb/hr) |
| --- | --- | --- |
| methanol | 0.13 | 124 |
| water | 99.87 | 98,576 |

[1]total flow rate=98,700

Thus, while methanol passes through the activated carbon unaffected, the remaining constituents are adsorbed and are thereby amenable to recovery through activated carbon regeneration (e.g., using liquid or gaseous ethanol) and separation.

The carbon column effluent is then subjected to steam stripping, with 25.4% by weight steam at 25,000 lb/hr. The vapor overhead and liquid bottoms from the stripping column are analyzed as follows:

TABLE 7

| Overhead | % by weight | [1]Flow Rate (lb/hr) |
|---|---|---|
| methanol | 0.52 | 123 |
| water | 99.48 | 23,627 |

[1]total flow rate=23,750 lb/hr.

TABLE 8

| Bottoms | % by weight | [1]Flow Rate (lb/hr) |
|---|---|---|
| methanol | 0.001 | 1 |
| water | 99.999 | 99,949 |

[1]total flow rate=99,950

Hence, a steam consumption of only 1250 lb/hr is sufficient, in conjunction with the activated carbon adsorption, to remove essentially all of the potential pollutants from the evaporator condensate feed, while moreover permitting recovery of these constituents. In addition, 23,750 lb/hr of steam is reusable in heating the evaporator effect as explained, which represents another considerable saving.

EXAMPLE III

A typical waste condensate feed from a conventional Kraft pulp mill is treated by methods in accordance with the present invention, and particularly FIG. 1. First of all, the waste condensates (from the digester relief and blow gas condensates and spent pulping liquor) are directed to a steam stripping column waste liquor condensate feed which includes the following:

TABLE 9

| Water Liquor Constituents | % by weight | Feed Rate (lb/hr) |
|---|---|---|
| methanol | 0.35 | 345 |
| ethanol | 0.03 | 30 |
| acetone | 0.01 | 10 |
| dimethyl sulfite | 0.01 | 10 |
| dimethyl disulfite | 0.01 | 10 |
| delta corene | 0.01 | 10 |
| alpha pinene | 0.05 | 49 |
| beta pinene | 0.01 | 10 |
| limonene | 0.005 | 5 |
| methyle mercaptan | Trace | — |
| hydrogen sulfide | Trace | — |
| water | 99.515 | 98,221 |

This liquor is fed to the top of a packed steam stripping column at a rate of 197.4 gpm, or 98,700 lb/hr, so that the lb/hr feed rate of the respective liquor constituents amounts to that shown in the right hand column of Table 9. Steam at the rate of 25,000 lb/hr is fed to the bottom of the column for countercurrent, stripping contact with the feed descending through the column. This contact has the effect of stripping and entraining the chemical constituents from the feed so that the underflow leaving the column (at 99,950 lb/hr) consists of the following:

TABLE 10

| Effluent Bottoms | % by weight | Flow Rate (lb/hr) |
|---|---|---|
| methanol | 0.003 | 3 |

TABLE 10-continued

| Effluent Bottoms | % by weight | Flow Rate (lb/hr) |
|---|---|---|
| dimethyl disulfite | 0.007 | 7 |
| delta corene | 0.007 | 7 |
| alpha pinene | 0.034 | 34 |
| beta pinene | 0.007 | 7 |
| limonene | 0.003 | 3 |
| water | 99.939 | 99,889 |

On the other hand, the vapor overhead leaves the upper end of the stripping column at a rate of 23,750 lb/hr and is composed of the following:

TABLE 11

| Vapor Overhead | % by weight | Flow Rate (lb/hr) |
|---|---|---|
| methanol | 1.44 | 342 |
| ethanol | 0.13 | 30 |
| acetone | 0.04 | 10 |
| dimethyl sulfite | 0.04 | 10 |
| dimethyl disulfite | 0.01 | 3 |
| delta corene | 0.01 | 3 |
| alpha pinene | 0.07 | 15 |
| beta pinene | 0.01 | 3 |
| limonene | 0.01 | 2 |
| methyl mercaptan | Trace | — |
| hydrogen sulfide | Trace | — |
| water | 98.24 | 23,332 |

From the foregoing data it will be appreciated that only about 1250 lb/hr of steam is used in the stripping operation, which amounts to only about 5.0% of the total process steam, or 1.27% by weight of feed. Thus, extremely efficient removal of the valuable feed constituents is obtained with very little steam consumption, i.e., about 99% removal of volatiles such as methanol, ethanol, acetone, dimethyl sulfite, methyl mercaptan and hydrogen sulfide, with about 35% removal of dimethyl disulfite, deltra corene, alpha pinene, beta pinene and limonene.

By way of contrast, if the identical evaporator feed is stripped in the conventional manner at the same flow rate using the customary 10% by weight of feed steam method, only about 70% of the methanol, ethanol, acetone, dimethyl sulfite, methyl mercaptan and hydrogen sulfide is removed, and only about 10% of the dimethyl disulfite, delta carene, alpha pinene, beta pinene and limonene is recovered.

EXAMPLE IV

In this test the conditions and evaporator condensate feed are identical with those of Example III, except that the feed is directed to an adsorption column packed with activated carbon prior to steam stripping. In particular, the feed condensate is allowed to descend through a conventional adsorption column packed with fresh activated carbon, and the following comprised the under flow effluent off the column.

TABLE 12

| Carbon Column Effluent | % by weight | [1]Flow Rate (lb/hr) |
|---|---|---|
| methanol | 0.35 | 345 |
| ethanol | 0.03 | 30 |
| acetone | 0.01 | 10 |
| water | 99.61 | 98,315 |

[1]total effluent flow rate was 98,700 lb/hr.

Thus, while substantially all of the methanol, ethanol and acetone pass through the carbon column unaffected, the remaining constituents of the condensate feed are substantially all adsorbed. This permits conventional regeneration of the tower with hot gaseous ethanol and subsequent fractionation of the chemical species in order to obtain salable quantities of the adsorbed chemical constituents.

The carbon column effluent is next steam stripped by delivering the same to the upper end of a packed stripping column at a rate of 98,700 lb/hr, as in Example III. The stripping steam is again introduced at a rate of 25,000 lb/hr giving a vapor overhead off the column to be directed to the evaporator effects which consists of:

TABLE 13

| Vapor Overhead | % by weight | ¹Flow Rate (lb/hr) |
|---|---|---|
| methanol | 1.44 | 342 |
| ethanol | 0.13 | 30 |
| acetone | 0.04 | 10 |
| water | 98.39 | 23,368 |

¹the total vapor overhead flow rate was 23,750 lb/hr, representing a 1250 lb/hr steam loss during stripping.

TABLE 14

| Bottoms | % by weight | Flow Rate (lb/hr) |
|---|---|---|
| methanol | 0.003 | 3 |
| water | 99.997 | 99,947 |

It will thus be apparent that activated carbon adsorption coupled with the novel steam stripping method hereof yields exceedingly purified waste waters while moreover permitting significant recovery of valuable chemical by-products.

Following steam stripping as described in Examples I–IV, the overhead vapor from the stripper is fed to the heat exchange sections of a multiple effect evaporator. This is for the purpose of heating the volumes of waste liquors within the latter and concentrating the same. As a consequence of the concentration of the liquors, the steam and entrained constituents are themselves condensed, and in this condition are delivered to a conventional fractionation column or columns. The latter includes an incoming steam line as well as multiple packing sections for the purpose of refluxing and separating the condensed chemicals and allowing their separate recovery in the well known fashion. In this manner the separate, condensed chemical fractions are collected in good yields and at high purity for reuse or sale.

Having thus described the invention, what is claimed as new and desired to be secured by Letters Patent is:

1. A process for treating waste liquors such as condensates and spent liquors derived from chemical processing operations, comprising the steps of:
   directing said liquors to an evaporation zone;
   heating said liquors in said evaporation zone to effect concentration of the liquors therein with consequent evolution of vapors, said heating including the step of directing a heating medium which includes steam to the evaporation zone for indirectly heating and concentrating at least a portion of said liquors therein;
   condensing said vapors;
   directing at least a portion of the condensed vapors to a stripping zone;
   stripping at least a portion of the chemical constituents within said condensed vapors by subjecting the latter to the action of stripping steam in the stripping zone; and
   directing at least a fraction of said stripping steam, after the latter has acted to strip chemical constituents from the condensed vapors in said stripping zone, back to said evaporation zone as at least a part of said heating medium for heating and concentrating additional volumes of liquor in the evaporation zone.

2. The process as set forth in claim 1 wherein said evaporation zone comprises at least one steam heated evaporator effect.

3. The process as set forth in claim 1 wherein said liquors comprise spent pulping liquor and condensates derived from the sulfite pulp making process.

4. The process as set forth in claim 1 wherein said liquors comprise spent pulping liquor and condensates derived from the Kraft pulp making process.

5. The process as set forth in claim 1 wherein at least a portion of said condensed vapors are directed to an adsorption zone for the adsorption of certain of the chemical constituents thereof prior to direction thereof to said stripping zone.

6. The process as set forth in claim 5 wherein at least a portion of said condensed vapors are directed to a contact zone for contact therein with vent gases derived from the heating of said liquors in said evaporation zone to thereby condense at least a portion of the vent gases, said condensed vent gases and condensed vapors thereafter being treated in said adsorption zone.

7. The process as set forth in claim 6 wherein said condensed vapors and condensed vent gases are heated in said contact zone.

8. The process as set forth in claim 7 wherein said condensed vapors and condensed gases are cooled in a cooling zone after leaving said contact zone and prior to treatment thereof in said adsorption zone.

9. The process as set forth in claim 7 wherein any remaining uncondensed vent gases resulting from the contacting of said vent gases and condensed vapors are cooled to condense the same.

10. The process as set forth in claim 5 wherein said adsorption zone comprises an adsorption column packed with activated carbon.

11. The process as set forth in claim 10 wherein said waste liquors are derived from the sulfite pulp making process, and said activated carbon is capable of adsorbing substantially all of the furfural, acetic acid and sulfur dioxide remaining in said condensed vapors.

12. The process as set forth in claim 1 wherein said steam in said stripping zone amounts to from about 15 to 35% by weight, based upon the weight of the condensed vapors entering said stripping zone.

13. The process as set forth in claim 12 wherein said steam amounts to about 30% by weight, based upon the weight of the condensed vapors entering said stripping zone.

14. The process as set forth in claim 1 wherein the stripping steam is directly contacted with said condensed vapors in said stripping zone whereby the steam directed back to said evaporation zone has entrained therein the stripped chemical constituents, the latter and said stripping steam being at least partially condensed during heating of said additional liquor volumes.

15. The process as set forth in claim 14 wherein condensed volumes of said steam and entrained constituents are directed to a separation zone after the heating of said additional liquor volumes.

16. The process as set forth in claim 15 wherein said separation zone comprises a steam heated fractionation column capable of separating said chemical constituents.

17. The process as set forth in claim 1 wherein said evaporation zone comprises a plurality of interconnected evaporator effects.

18. The process as set forth in claim 17 wherein said stripping steam directed back to said evaporation zone is directed to the heat exchanger of the highest temperature effect of said interconnected evaporator effects in order to heat additional volumes of said liquor therein.

19. The process as set forth in claim 18 wherein the vapors evolved in the highest temperature evaporator effect by virtue of the heating therein of said additional volumes of liquor by said returned stripping steam are directed to the heat exchanger of a lower temperature effect of said interconnected evaporator effects for the heating and evaporation of additional volumes of liquor therein, with consequent evolution of vapors in said lower temperature effect and condensation of said directed vapors in the heat exchanger of said lower temperature evaporator effect.

20. The process as set forth in claim 18 wherein the vapors evolved in said other evaporator effect are condensed in a separate condensing zone.

21. The process as set forth in claim 18 wherein the condensed vapors from said condensing zone and the heat exchanger of said other effect are together directed to said stripping zone.

22. The process as set forth in claim 1 wherein said stripping zone comprises a steam stripping column.

23. The process as set forth in claim 22 wherein said steam and condensed vapors are countercurrently contacted in said steam stripping column.

* * * * *